June 11, 1929. A. KOLODY 1,716,644
BRAKING DEVICE FOR AEROPLANES
Filed June 21, 1926
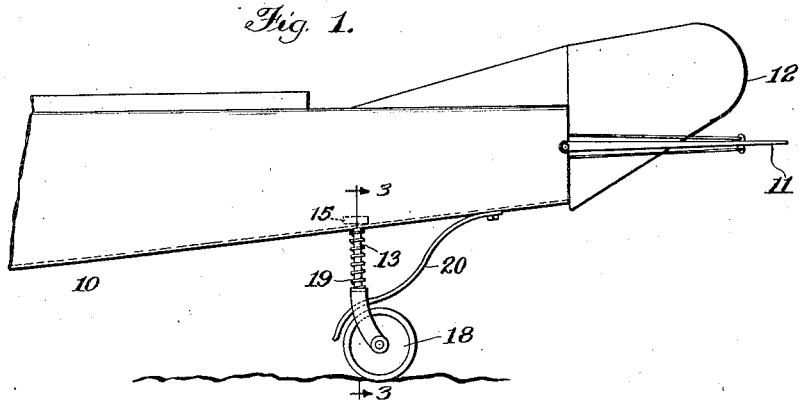
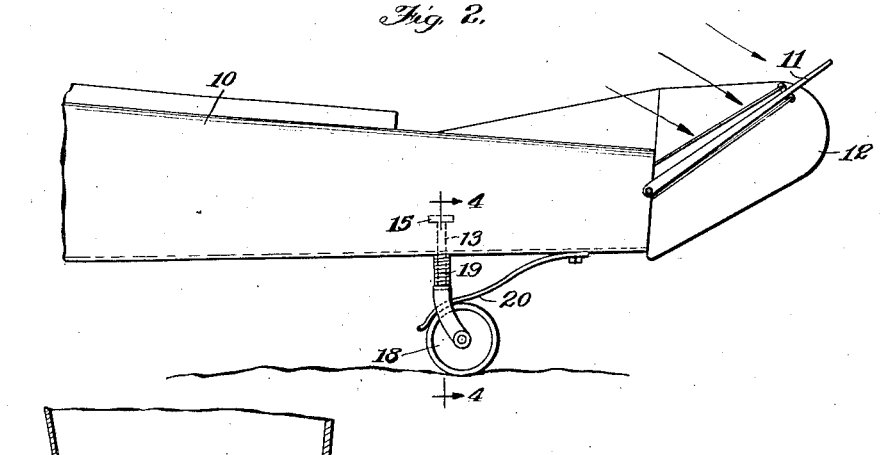
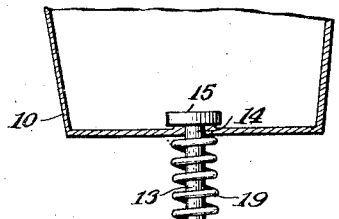
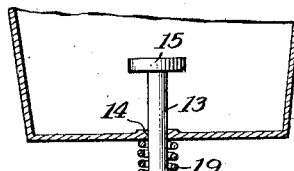
Inventor
A. Kolody
By B. Pelechowicz
Atty.

Patented June 11, 1929.

1,716,644

UNITED STATES PATENT OFFICE.

ANDREW KOLODY, OF CHICAGO, ILLINOIS.

BRAKING DEVICE FOR AEROPLANES.

Application filed June 21, 1926. Serial No. 117,257.

The present invention relates to aeroplane braking devices and its main object is the provision of a device wherein the resistance of air striking the rear horizontal planes of the aeroplane is utilized for actuating a mechanism for braking the aeroplane.

Another object of the invention is to provide a braking device for aeroplanes in combination with rear swivel wheel.

With the above general objects in view and others that will appear as the nature of the invention is better understood, the same consists in the novel construction, combination and arrangement of parts hereinafter more fully described, illustrated in the accompanying drawing and pointed out in the appended claims.

In the drawing forming a part of this application and in which like designating characters refer to corresponding parts throughout the several views, Fig. 1 is a side elevational view of the rear portion of the aeroplane illustrating the present invention in its inoperative condition;

Fig. 2 is a similar view illustrating the braking mechanism in its operative condition;

Fig. 3 is a cross-sectional view taken on line 3—3 of Fig. 1; and

Fig. 4 is a cross-sectional view taken on line 4—4 of Fig. 2.

The invention, used in connection with fuselage 10 having the rear horizontal tail planes 11 of the conventional type, and rudder 12, comprises post 13 passing through an opening 14 made in the bottom of fuselage 10. The upper end of said post 13 is provided with head 15 preventing the disengagement of the post from the fuselage.

The lower end of said post 13 is threaded for receiving the U-shaped bracket 16, the lower ends of which provide bearings for axle 17 of wheel 18. Interposed between the bottom of the fuselage 10 and said U-shaped bracket 16 is coil spring 19.

Mounted on the bottom of fuselage 10 at a point between post 13 and the rear termination of fuselage 10 is spring brake 20 of which the forward end remains within U-shaped bracket 16 and overhangs wheel 18, as plainly seen on Figs. 1 and 2.

In descending the aeroplane normally first lands on its forward landing wheels and runs on the ground by its forward landing wheels for a considerable distance before the rear landing or swivel wheel hits the ground. As soon as the forward landing wheels have come in contact with the ground to put the present device into operation the operator raises the rear horizontal planes 11 to the position illustrated on Fig. 2. By doing this said rear horizontal planes will be met with a resistance of air coming from the direction indicated by arrows on Fig. 2, which resistance will force the rear end of fuselage 10 downwardly towards the ground, causing the bottom of the fuselage 10 to assume the position in respect of post 13 shown in Fig. 2. By virtue of the pressure of air upon rear horizontal planes 11 the bottom of the fuselage 10 will be forced towards the U-shaped bracket 16 causing the compression of the coil spring 19, which condition will bring wheel 18 towards the spring brake 20 causing a frictional contact of the wheel with said brake, by virtue of which friction the motion of said wheel 18 will be retarded causing the slowing down of the aeroplane as it travels upon the ground. The surface of brake 20 which contacts with the periphery of wheel 18 is covered with brake lining material as shown to increase friction.

While there is described herein a preferred embodiment of the present invention, it is nevertheless to be understood that minor changes may be made therein without departing from the spirit and scope of the invention as claimed.

Since brake member 20 extends through fork 16 the swivelling action of the latter about 13 as an axis will be limited. However the width of brake member 20 is considerably less than the distance between the arms of fork member 16, the latter will be enabled to swivel or turn enough for practical purposes. This construction is particularly desirable since brake member 20 maintains the periphery of wheel 18 inclined or pointed toward the direction of flight and prevents it from swinging transversely thereto. This obviates breakage of the wheel when landing and eliminates air obstruction in flight.

It is understood, of course, that spring 19 is strong enough to support the tail fuselage 10 and that brake 20 will only engage 18 when 11 is raised as in Figure 2 in ground flight.

What I claim as new is:

1. In a flying machine having a rear swivel wheel, a U-shaped bracket wherein said wheel is mounted, a post carrying said bracket, said post being mounted in the fuselage and being adapted for vertical sliding movement in the fuselage, a coil spring interposed between said bracket and the fuselage, a braking element affixed by one of its ends to the fuselage, the other end of said brake element overhanging said wheel, and means for bringing the fuselage and said band toward the said wheel on travel of the machine on the ground.

2. In an aeroplane having a tail, horizontal tail planes for raising or lowering the tail in flight, a ground engaging tail wheel and means for mounting said wheel for yielding movement in the direction of the tail; the combination of a brake member carried by the tail and adapted to engage a portion of said wheel when the latter is compressed toward the tail solely by contact with the ground through the movement of the tail under the influence of said tail planes.

3. In an aeroplane having a tail, horizontal tail planes for raising or lowering the tail in flight, a ground engaging tail wheel and means for mounting said wheel for yielding movement in the direction of the tail; the combination of a brake member carried by the tail and adapted to engage a portion of said wheel when the latter is compressed toward the tail solely by contact with the ground through the movement of the tail under the influence of said tail planes, and said yielding means having a guide portion cooperating with said brake to aline the same with the wheel.

4. In an aeroplane including a body and having a ground contact wheel, a brake element carried by the body, means for mounting said wheel for limited vertical movement toward and from the body, said wheel-mounting means having a guide portion normally engaging said brake for alining the same with said wheel, and spring means for normally maintaining the wheel at the limit of its movement away from said body.

5. The combination with a flying machine having a ground engaging tail wheel; of means for mounting said wheel for yielding movement toward the tail, a brake carried by the tail and adapted to engage the wheel on such yielding movement, and the yielding wheel mounting means being of a strength to support the weight of the tail, the tail having planes manipulatable in ground flight to sufficiently augment the weight of the tail to bring the brake to operative engagement with the wheel.

6. The combination with a flying machine having a ground engaging tail wheel; of means for mounting said wheel for yielding movement toward the tail, a brake carried by the tail and adapted to engage the wheel on such yielding movement, and the yielding wheel mounting means being of a strength to support the weight of the tail.

7. In a flying machine having a rear swivel wheel, a U-shaped bracket wherein the wheel is mounted, a post carrying the bracket, said post being mounted in the tail fuselage and being adapted for vertical sliding movement in the fuselage, a coil spring interposed between said bracket and the fuselage, a brake element having one end attached to the fuselage and the other end extending between the arms of said U-shaped bracket and overhanging said wheel, the width of said brake element being less than the space between the arms of said U-bracket whereby to permit limited swivelling movement thereof and to hold the periphery of the wheel pointed in the general direction of flight, the strength of said coil spring being sufficient to support the weight of the tail fuselage, and the weight of the fuselage being augmentable by tail plane manipulation to compress said coil spring to bring about contact between the brake and wheel when the machine is in ground flight.

In testimony whereof I affix my signature.

ANDREW KOLODY.